R. S. PEIRCE.
PIPE HOLDER.
APPLICATION FILED MAY 1, 1916.
1,292,034.
Patented Jan. 21, 1919.
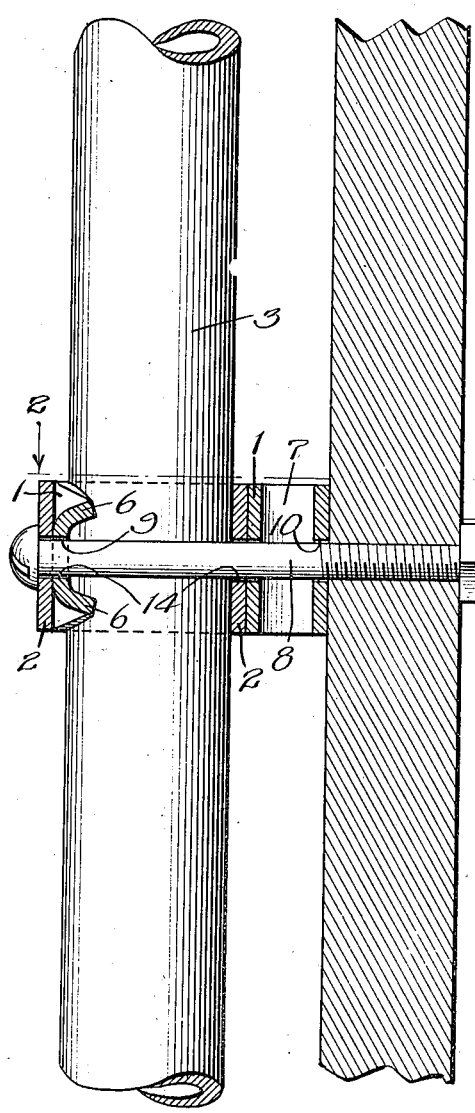
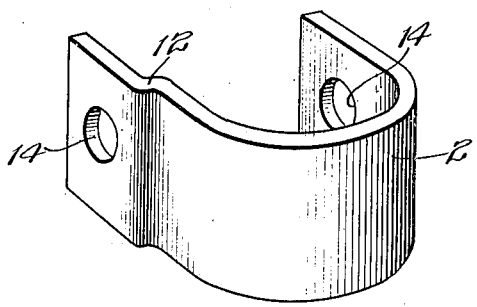
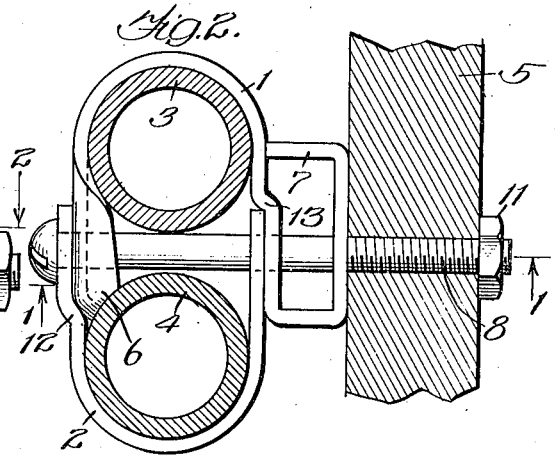
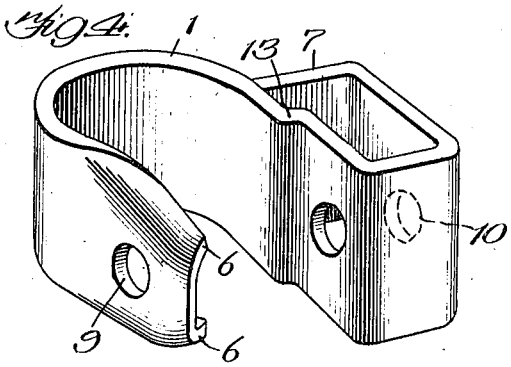
Inventor:
Ralph S. Peirce
By G. L. Cragg
Attorney

UNITED STATES PATENT OFFICE.

RALPH S. PEIRCE, OF HINSDALE, ILLINOIS.

PIPE-HOLDER.

1,292,034.     Specification of Letters Patent.     Patented Jan. 21, 1919.

Application filed May 1, 1916. Serial No. 94,609.

*To all whom it may concern:*

Be it known that I, RALPH S. PEIRCE, citizen of the United States, residing at Hinsdale, in the county of Dupage and State of Illinois, have invented a certain new and useful Improvement in Pipe-Holders, of which the following is a full, clear, concise, and exact description, reference being had to the accompanying drawings, forming a part of this specification.

My invention relates to pipe holders and has for one of its objects the construction of a pipe holder upon which any degree of pressure necessary to securing the engagement of the pipe holder with the pipe may be applied without collapsing the holder, and for another of its objects the construction of a pipe holder which is adapted to hold two pipes in assembly, there being novel characteristics of construction in the pipe holder that are employed in carrying out the aforesaid objects. A holder of my invention is formed of heavy strip material of sufficient flexibility to enable it to be placed in clamping engagement with piping, there being desirably two clamping parts to the structure for the purpose of clamping two pipes in place, though the invention is not to be limited to such two part construction. Each of these two clamping parts is individual to the pipe to be clamped thereby, there preferably being a clamping bolt common to both these clamping parts, this clamping bolt passing between the pipes when it is directed through the clamping parts or members into the support.

I will explain my invention more fully by reference to the accompanying drawing showing the preferred embodiment thereof and in which Figure 1 is a view of a device constructed in accordance with the invention on line 1 1 of Fig. 2; Fig. 2 is a plan view of the structure; Fig. 3 is a perspective view of one of the clamping parts or members; and Fig. 4 is a perspective view of the other of the clamping parts or members.

Like parts are indicated by similar characters of reference throughout the different figures.

The pipe holder of my invention desirably includes two clamping members 1 and 2 disposed in the same plane and adapted for assembly in such a manner that they will hold two pipes 3 and 4 abreast with the pipes equidistant from the support 5, each of said members having spaced apart ends and a semi-cylindrical pipe receiving portion from which the sides thereof project. The clamping member 1 is curved to receive the pipe 3, the portion of this clamping member in which the pipe is received being of U-shape. The outer limb of the U-shaped portion of the clamping member 1 projects materially beyond the pipe 3 and is stiffened, where projected, so that it will not materially flex with respect to the pipe engaging portion of the clamping member, a result which is desirably secured by flanging as indicated at 6. The other side of the U-shaped portion of the clamping member is returned upon itself as indicated at 7 to form a closed parallelogram having one side in alinement with the center of the curve of the pipe receiving portion of the clamping member. The clamping bolt 8 is passed through alined apertures 9, 10 into the support 5 and lies in the plane of the clamping members 1 and 2. When the nut 11 or other tightening means is actuated to tighten the clamp the side of the clamping member having the parallelogrammatic formation will yield sufficiently to enable the pipe 3 to be thoroughly gripped, whereas the other side of the clamping member having the flanged formation 6 will not materially yield whereby the bolt 8 will remain straight. The wall of the parallelogrammatic formation that is in alinement with the center of the pipe 3 acts as a stop to prevent the pipe engaging portion of the holder 1 from being bent toward the support 5 whereby the location of the pipe 3 may be predetermined with exactness inasmuch as the clamping member holding it will not have its shape materially modified by the action of the clamping bolt.

The construction thus far specifically described is readily adapted for use in holding a single pipe. Where it is desired to hold two pipes abreast the extra clamping member 2 may be provided, this clamping member being offset at 12 to receive the outer end of the clamping member 1, while the inner side of the pipe receiving portion of the clamping member 1 is offset at 13 to receive the inner side of the U-shaped clamping member 2, these offset formations permitting the pipes 3 and 4 to be held equidistant from the support 5. The clamping bolt 8 passes through the openings 14 that are placed in alinement with the openings 9 and 10. The pipe 3 is maintained within the clamping member 1 independently of the bolt 8 by the inner ends of the flanges 6. The pipe 4 is similarly maintained within the clamping member 2 independently of the bolt 8 by the outer ends of the flanges 6 as indicated in Fig. 3, these outer ends having a curvature fitting the curvature of the pipe 4.

While I have herein shown and particularly described the preferred embodiment of my invention I do not wish to be limited to the precise details of construction shown as changes may readily be made without departing from the spirit of my invention, but having thus described by invention I claim as new and desire to secure by Letters Patent the following:—

1. A pipe holder including two U-shaped pipe clamping members lying in substantially the same plane and each adapted to hold a pipe in addition to the other and having its ends overlap the ends of the other; and a clamp actuating bolt lying substantially in the plane of the clamping members and passing through said overlapping ends, said bolt also serving as an attaching bolt for mounting the clamping members.

2. A pipe holder including a U-shaped body of flexible material the sides of which project beyond the pipe receiving portion of the holder; and attaching means pressing upon the projecting end of one side of the holder and serving to press the other side of the holder toward the support for the holder, the latter side being turned back upon itself and terminating in a portion projecting toward and engaging the pipe receiving portion of the holder.

In witness whereof, I hereunto subscribe my name this twenty-sixth day of April, A. D., 1916.

RALPH S. PEIRCE.

Witnesses:
G. L. CRAGG,
ETTA L. WHITE.